Sept. 24, 1935.  F. A. HUG  2,015,627
AIRCRAFT AND ARTILLERY OBSERVATION INSTRUMENT
Filed April 20, 1934  2 Sheets-Sheet 1
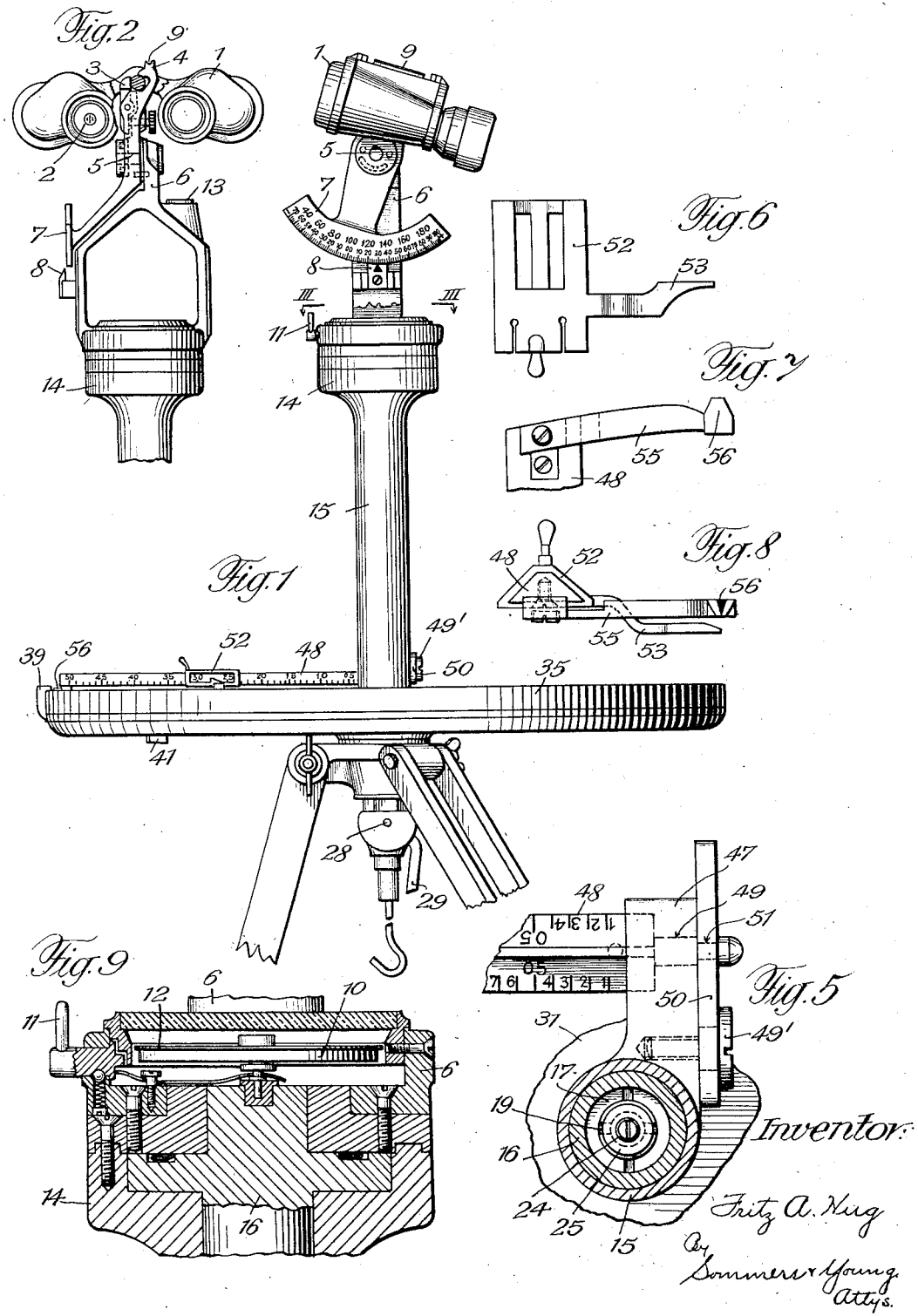

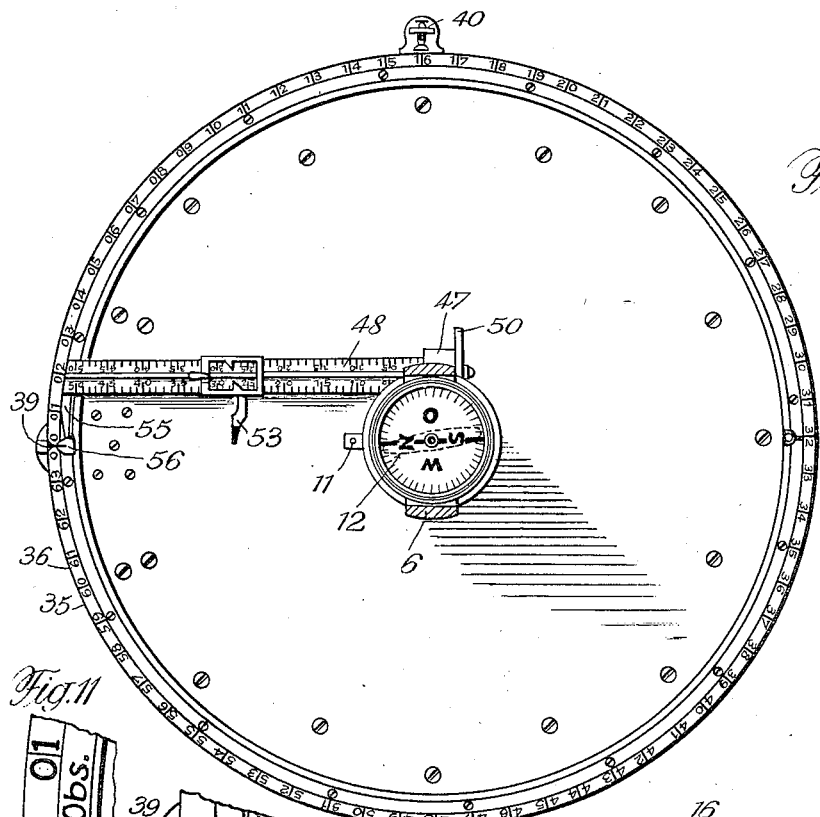

Patented Sept. 24, 1935

2,015,627

UNITED STATES PATENT OFFICE 2,015,627

AIRCRAFT AND ARTILLERY OBSERVATION INSTRUMENT

Fritz A. Hug, Berkeley, Calif., assignor to Firm of Hug Brothers, St. Gallen, Switzerland Application April 20, 1934, Serial No. 721,608
In Germany April 27, 1933

14 Claims. (Cl. 33—69)

This invention relates to an instrument for defining the geographical position and height of aircraft in flight, or for defining the position of enemy-artillery or machine gun-nests etc. and for observing objects being bombarded.

It is known, that by means of optical instruments, as for instance, a telescope, possessing graduated collimation-lines, the distance of an observed object and in connection with the observation instrument the horizontal and vertical deviation of the line of aim can be defined. By the distance observed and the angles of horizontal and vertical deviation, the position of the observed object in respect to the point of observation is computed.

Furthermore an observation-instrument for anti-aircraft-guns is known, by which the height at which an aircraft flies can be found only through cooperation of two instruments stationed at a distance from each other. This instrument comprises a device for defining the line of aim, comprising a graphical arm which follows the movements of the instrument, thus describing a curve on a horizontal drawing table, which curve is similar to the one flown by the airplane under observation, and from which the speed of the craft proportionally to its size and direction can be derived. Since thereby the position of the graphical arm depends on the elevation, that is the angle of observation, but not on the distance of the object, and since there is no geographical map provided, but a curve-chart only, the instrument possesses no facilities to quickly define the geographical position of the object of observation.

The aircraft and artillery observation instrument according to the present invention is different from the known instruments, in that besides the means of determining the line of aim of the optical instrument as to horizontal and vertical angle of deviation which means are known per se, it possesses a map-plate, above which floats a scale-arm, that swings around the vertical axis of the instrument when the latter is turned to be aimed at an object, the arm thus automatically always follows the motions of the telescope and is therefore always in line with the direction of observation. On the scalearm rides a glider which is slid into position according to distance-point of observation to object which is derived from the data of observation, thus coming to rest on the point of the map, which indicates the position of the observed object over or on the ground.

Since by means of this device the geographical position of an object, for instance, an aircraft can be determined very quickly, it is made possible, that a nearing enemy-airforce can be reported rapidly and precisely so that the means of counter-attack, defense and protection can be brought into play at once, thus being most effective.

The accompanying drawings show by way of example the invention embodied in one of the forms possible. In the drawings:

Figure 1 is an elevation of the whole instrument;

Figure 2 is an elevation of the upper part of Fig. 1, turned about 90°;

Figure 3 is a vertical section along the line III—III of Fig. 1;

Figure 4 is a section through the lower part of the instrument;

Figures 5–12 show details.

In the illustrated example a fieldglass 1 (preferably a binocular 8x) serves to observe the object in question. In its left ocular the fieldglass possesses a 5% o circle 2, or other means of comparison (graduated collimation-lines etc.). The fieldglass is easily detachable from arm 4, with which it is connected by clamp 3, which rocks on pivot 5 of frame 6, and bears segment 7, the graduations of which serve to indicate the degree of inclination of the line of aim of the fieldglass; the inclination can be read off at a mark 8, set into frame 6. For easy adjustment of the fieldglass, the latter is provided with a sight-groove 9, which helps to bring the object quickly into the field of vision of the fieldglass.

Built into frame 5 is a compass 10, of which details (like locking lever 11) are shown in Fig. 9. The rim of the compass-cover, which carries a mark is rotatable for the purpose of compensation for the deviation from the magnetic north according to the geographic position of the station when the compass-card is only marked with magnetic north; in case of the usual compass-card the deviation has to be compensated for by angularly adjusting the position of the card in reference to the needle. Besides that frame 5 comprises a tubular spirit-level for adjustment of the instrument to a true horizontal position.

Frame part 6 is connected rigidly with the upper part 14 of tube 15, which latter is arranged rotatably on axis 16. The lower extremity of it is bored out and is slipped loosely over expansion-bushing 17, which in its part carries a ring-flange 18 (Fig. 4). Inside the expansion-bushing 17 is a further expansion-bushing 19 of which the rigid (not split) part 20 is threaded on its lower end, and provided with a flange 21, and is held in tripod-head 22 by a nut, while pins 23 prevent its turning relatively to the tripod-head. In the borehole of expansion-bushing 19 lodges loosely stem 24, which carries at its upper end a cone-shaped nut 25, fitting the correspondingly tapered out end of expansion-bushing 19, and which causes in its downward motion a spreading of the expansion-bushings 17 and 19, thus connecting axis 16 rigidly to tripod-head 22; tube 15 with the observation-fieldglass 1 remaining rotatable on axis 16. To induce the down movement of the cone-shaped nut 25, the stem 24 comprises a cross pin 26, lodging in curved slot 27 of lever 29, which can be swung on pin 28. Slot 27 is eccentric to pin 28 and by depressing lever 29, stem 24 is caused to move down and consequently the spreading of expansion-bushings 17 and 19 occurs.

Fastened to flange 18 of expansion-bushing 17 is the disk-like map-plate 30, which serves as a support for map 31 covered with a transparent sheet (celluloid or the like material) as means of protection. Sheet and map 31 are held down by a split retaining-ring 32, which can be pushed under ring 33 fastened to map-plate 30. For quick exchange of map 31 retaining ring 32 comprises a small knob 34, by which the ring can be taken off quickly. Arranged rotatably, adjustably and lockably at the circumference of map-plate 30, is scale-ring 35 with its 64 graduations 36. Guided between map-plate 30 and cover-ring 37, which is fastened to plate 30, is another ring 38, comprising a mark 39 movable over graduations 36 of scale-ring 35, and displaced at an angle of 90° from mark 39 possessing furthermore an operating lever 40, the whole serving as a means of determining the direction of motion of a target (f. i. airplane). The locking or freeing of scale-ring 35 with graduation 36 is performed by means of lever 41 which operates clamping screw 45 in a screw-threaded aperture in cover ring 37. Lever 41 (Figs. 4 and 10) is provided with a pin 42, which lodges in guide slot 43 in the under side of cover ring 37. Guide slot 43 has a curved position for the purpose of guiding lever 41 during its movement in locking and interlocking movements, and also has a straight portion opening at the inner edge of the cover ring to allow passage of pin 42 when lever 41 is being inserted or withdrawn from its assembled position. The lower end part 44 of clamp screw 45 is flattened and adapted to fit the forked end of clamping lever 41. When turned up clamp screw 45 presses against locking clamp 46, by which scale ring 35 is locked against plate 30, or released when screw 35 is turned in the opposite direction.

Tube 15 carries a bracket 47 (Figs. 3 and 5) to which is detachably secured a scale-arm 48. For this purpose the bracket 47 has a triangular recess into which the end of scale-arm 48 fits. The pin-like extremity 49 of the scale-arm penetrates the bracket 47, and the arm is held in its position by lever 50, swinging on screw 49' and linking with its slot into recess 51 of arm-end 49. Scale-arm 48—being of triangular cross-section—has a distance-scale engraved on its two upper bevelled sides. Slide 52 with indicator 53 (Figs. 6 and 7) is movable along the scale-arm 48. On the outer end of scale-arm 48 is secured an indicator 55 (Figs. 3 and 7) bearing the marking 56, which cooperates with graduation 36. The marking 56 which might for some purpose be replaced by a vernier, and hand 53 are so displaced from the scale-arm 48, that their reading-points lay on the diametrical line going through the vertical axis of the instrument. The tripod possesses a ballast-hook 57.

The instrument just described is used as follows for the determination of the geographical position of an aircraft:

The map, with the point of observation taken as its center, is cut out to a circular shape; in this example 50 kilometers of the scale of the map (1:250,000) being the radius and the centre is punched out according to the diameter of expansion-bushing 17. The map is then laid on map-plate 30, so that the north-direction of the map coordinates with the zero-mark (Air-O-Obs.) on ring 33. Then the celluloid-sheet is laid upon the map and held down in place by pressing retaining-ring 32 into position under ring 33.

The tripod 22 is set up at the point of observation, the map-plate 30 with expansion-bushing 17 is slipped over expansion-bushing 19, and the upper part of the instrument with the hollow part of axis 16 is slipped over expansion-bushing 17. The fieldglass 1 is put into place and fastened by clamp 3. The scale-arm 48 is inserted into bracket 47 and held in position by depressing lever 50. By means of the built in spirit-level 13, the axis of the instrument, is brought to a true vertical position and the ballast-sack is hung onto hook 57 to steady the tripod.

By turning of locking-lever 11 the compass is freed. Handmark 56 of scale-arm 48 is coincided with the marking "Air-O-Obs." and held in this position by hand. Map-plate 30 together with scale-arm 48 is now turned around, till the north on the compass-face coincides with the marking on the compass-cover-rim. Curve-lever 29 is then depressed, whereby map-plate 30, tripod 22 and axis 16 are rigidly locked together. The instrument is thus brought into correct operating position, true to north. When the instrument is used for observation of aircraft, the zero-mark of the graduations 36 remains adjusted on mark "Air-O-Obs." of ring 33, and lever 41 is taken off, so no accidental disadjustment can occur.

When an airplane is sighted by an observation group equipped with fieldglasses, aim is taken over sight-groove 9 by turning and tilting the fieldglass 1 of the instrument, till the plane appears in groove 9. Thereby the airplane has been brought into the field of vision of the binocular 1, and then the centre of the 5% o circle is aimed at it. The distance of the plane from the observation-station is derived from the known, actual size of the plane-type and the appearing-size (in the 5% o circle) of the plane, by means of a table, or through calculation or calculating-devices. From the angle of tilt of the field glass 1, which angle is read off segment 7 and in connection with the just derived distance, the height of flight and the horizontal or terrestrial distance is derived from a table or through calculation or calculating devices. Slide 52 is then set on this so found horizontal distance on scale-arm 48 and the hand 53 indicates on the map the geographical position or plan-square (of the map) over which the plane stands at the moment. The operator now moves operating-lever 40 till the direction of the thereon engraved plane coincides with the direction of flight of the observed plane; then the numeral data, defining the direction of flight is read off graduation 36 at the mark 39 and is transmitted to an information-center with the other data derived. The direction of observation is read off at marking 56 of hand 55 from graduation 35, and is given too in numeral value, serving merely as means of check by the information-center. This data is of special importance when the reports of different observation-stations are at hand at once, since the geographical position of the plane lays at the meeting-point of the lines of direction of observation of the different stations.

Furthermore, the data taken from the instrument, such as actual size of the object, the size appearing in the 5% o circle and the angle of tilt of the axis of sight can be set on respective scales of an instrument for mechanical derivation of the results from this data, and then the resulting distance and height of the object over the station of observation or above sea-level can be read off immediately. Such an instrument forms the subject matter of my co-pending application for Letters Patent Serial No. 722,773, dated April 27, 1934.

The above described instrument shows the particular advantage that its separate parts take up but little room and are very light, so that the instrument can be packed anywhere by one man as a light load. The parts are very quickly assembled to the instrument ready for use; the observation is made an easy task, which can be performed readily, accurately and without efforts.

In the instrument above described any optical instrument, such as telescope, telemetre etc. may be used in place of the fieldglass.

I claim as my invention:

1. In an instrument of the character described, said instrument having an axis, means for supporting an exchangeable map in position relative to the axis of the instrument conforming to the geographical position of the instrument on the ground, a scale arm detachably and pivotally mounted in an offset position on the axis of the instrument for movement over the map parallel thereto, and parallel to the diametral line through said axis, said scale arm having a hand adjustably mounted therealong and extending to said diametral line, said scale arm having graduations representing units of measure for adjusting said hand to a position on said map corresponding to the horizontal distance from the station of the instrument to the object of observation, said position of adjustment being derived from the data of observation, and thus indicating immediately the geographical position of the object of observation on or above a terrestrial or marine point on the map.

2. In an instrument of the character described, the combination of a map-plate, a rotatable ring, guided at the circumference of the map-plate and having circularly arranged graduations for indication of the horizontal direction or angle, a locking plate for fixing the map plate in any desired position and a clamp screw and key for actuating said locking plate, said key being removable only when the ring is locked.

3. In an instrument of the character described, the combination of a map plate having a circularly arranged graduated scale, a ring, the means to guide said ring at the circumference of said map plate, said ring having an operating lever and also an index mark, said operating lever serving to move said ring to a position denoting the direction of motion or flight of an observed object, said index mark registering said position on said circularly arranged scale.

4. In an instrument of the character described, the combination of an optical device, a clamping device at the upper part of said instrument for detachably connecting the optical device to the said upper part, and a tubular column comprising a compass having a rotatable and adjustable rim to compensate for deviation from the magnetic north without dislocating the compass needle, said upper part of the instrument with said tubular column being rotatably supported on an axis, a map plate having an expansion bushing, said axis having a tubular end adapted to slide over said expansion bushing of said map plate.

5. In a device of the type described, an optical observation instrument, an arm, means for detachably fixing said optical instrument to said arm, said arm being turnable about the vertical axis of the device and also about a horizontal axis, means for indicating the horizontal and vertical angles through which said optical instrument is displaced when aiming at an object, said optical instrument having a sight groove for easy and quick finding of the object within the field of vision of the optical instrument, a support for an exchangeable map which has the geographical position of the device as its centre, a scale arm turnably arranged about the vertical axis of the device and situated above said map and graduated into units of length corresponding to the scale of the map, and an indicator adjustable along said scale arm and adapted to be set to the horizontal distance obtained by the data of observation.

6. In a device of the type described, an optical observation instrument, an arm, means for detachably fixing said optical instrument to said arm, said arm being turnable about the vertical axis of the device and also about a horizontal axis, means for indicating the horizontal and vertical angles through which said optical instrument is displaced when aiming at an object, said optical instrument having a sight groove for easy and quick finding of the object within the field of vision of the optical instrument, a tripod, a circular plate, an exchangeable circular map supported on said plate and having the geographical position of the device as its centre, means for fixing said plate rigidly to said tripod in any adjusted position, a scale arm turnably arranged about the vertical axis of the device and situated above said map and graduated into units of length corresponding to the scale of the map, and an indicator adjustable along said scale arm and adapted to be set to the horizontal distance obtained by the data of observation.

7. In a device of the type described, an optical observation instrument, an arm, means for detachably fixing said optical instrument to said arm, said arm being turnable about the vertical axis of the device and also about a horizontal axis, means for indicating the horizontal and vertical angles through which said optical instrument is displaced when aiming at an object, said optical instrument having a sight groove for easy and quick finding of the object within the field of vision of the optical instrument, a tripod, a circular plate, a circular map exchangeably supported on said plate and having the geographical position of the device as its centre, means for fixing said plate rigidly to said tripod in any adjusted position, a ring provided with circular graduations, means for guiding said ring at the circumference of said plate, a clamp-screw and a removable key for locking said ring to said plate, said key being removable from assembled position only when said ring is locked, a scale arm turnably arranged about the vertical axis of the device and situated above said map and graduated into units of length corresponding to the scale of the map, and an indicator adjustable along said scale arm and adapted to be set to the horizontal distance obtained by the data of observation.

8. In a device of the type described, an optical observation instrument, an arm, means for detachably fixing said optical instrument to said arm, said arm being turnable about the vertical axis of the device and also about a horizontal axis, means for indicating the horizontal and vertical angles through which said optical instrument is displaced when aiming at an object, said optical instrument having a sight groove for easy and quick finding of the object within the field of vision of the optical instrument, a support, a map exchangeably supported on said support and having the geographical position of the device as its centre, a scale arm turnably arranged about the vertical axis of the device and situated above said map and graduated into units of length corresponding to the scale of the map, an indicator adjustable along said scale arm and adapted to be set to the horizontal distance obtained by the data of observation, the means for indicating the horizontal angular displacement comprising a circular graduated scale and an indicator fixed to the end portion of said scale arm and cooperating with said circular graduations for ascertaining the direction of aim or sight.

9. In a device of the type described, an optical observation instrument, an arm, means for detachably fixing said optical instrument to said arm, said arm being turnable about the vertical axis of the device and also about a horizontal axis, means for indicating the horizontal and vertical angles through which said optical instrument is displaced when aiming at an object, said optical instrument having a sight groove for easy and quick finding of the object within the field of vision of the optical instrument, a ring provided with circular graduations and guided at the circumference of said plate, a clamp-screw and a removable key for locking said ring to said plate, said key being removable from assembled position only when said ring is locked, a further ring guided on said map-plate, a mark on said ring cooperating with said circular graduations, and an operating lever cooperating with said further ring for determining the direction of flight or motion of the observed object.

10. In a device of the type described, an optical observation instrument, an arm, means for detachably fixing said optical instrument to said arm, a vertical tubular column to which said arm is attached, a compass mounted on said tubular column and provided with a rotatable and adjustable rim to compensate for deviation from the magnetic north, a tubular support on which said tubular column is rotatable, an expansion bushing over which said tubular support is slid, the tubular column and support forming together the vertical axis of the device, said arm being turnable about the vertical axis of the device and also about a horizontal axis, means for indicating the horizontal and vertical angles through which said optical instrument is displaced when aiming at an object, a tripod, a circular plate for supporting, a circular map exchangeably supported on said plate and having the geographical position of the device as its centre, means for fixing said plate rigidly to said tripod in any adjusted position, said expansion bushing being fixed to said circular plate, a scale arm turnably arranged about the vertical axis of the device and situated above said map and graduated into units of length corresponding to the scale of the map, and an indicator adjustable along said scale arm and adapted to be set to the horizontal distance obtained by the data of observation.

11. In a device of the type described, an optical observation instrument, an arm, means for detachably fixing said optical instrument to said arm, a vertical tubular column to which said arm is attached, a compass mounted on said tubular column and provided with a rotatable and adjustable rim to compensate for deviation from the magnetic north, a tubular support on which said tubular column is rotatable, an expansion bushing over which said tubular support is slid, the tubular column and support forming together the vertical axis of the device, said arm being turnable about the vertical axis of the device and also about a horizontal axis, means for indicating the horizontal and vertical angles through which said optical instrument is displaced when aiming at an object, a tripod, a circular plate, a circular map exchangeably supported on said plate and having the geographical position of the device as its centre, means for fixing said plate rigidly to said tripod in any adjusted position, said expansion bushing being fixed to said circular plate, a further expansion bushing cooperating with the first and fixed to said tripod, a cone for influencing said expansion bushings, and a lever for displacing said cone, a scale arm turnably arranged about the vertical axis of the device and situated above said map and graduated into units of length corresponding to the scale of the map, and an indicator adjustable along said scale arm and adapted to be set to the horizontal distance obtained by the data of observation.

12. In an instrument of the character described, the combination of a device comprising a map, a map plate on which said map rests, said plate being rotatable on a vertical axis, a tripod for supporting the instrument, and means including a depressible curved lever for holding said map plate stationary with respect to said tripod.

13. In an instrument of the character described, the combination of a plate carrying a map, a scale arm laterally set off of the diametral line going through the center of said map plate, said scale arm being detachably mounted and secured by a lever on a bracket of a tubular column and therewith pivoted on the axis of said instrument, a circularly arranged graduated scale, an indicator fixedly mounted on the free end of said scale arm and extending to said diametral line and connecting with said circular scale, the position of said indicator with reference to said scale denoting the direction of an observed object.

14. An instrument of the character described, comprising the combination of a tube, a support having an expansion bushing fixed on said support, a second expansion bushing, the first-mentioned bushing fitting within the second bushing, both of said bushings extending within said tube, and an expanding device comprising a cone-shaped expander at the end of said bushings, a stem connected with said cone and a curved lever for actuating said stem when depressed to draw said expander into said bushings and expand said bushings in said tube for fixing said tube with respect to said support.

FRITZ A. HUG.